United States Patent [19]

Harima et al.

[11] 4,382,999
[45] May 10, 1983

[54] WATER-SWELLABLE COMPOSITE CAULKING MATERIAL FOR PREVENTING WATER LEAKAGE

[75] Inventors: Hiroshi Harima; Yoshihiro Yoshioka, both of Hasaki; Toshihiro Kimura, Ageo; Kazuhiro Takasaki, Warabi, all of Japan

[73] Assignees: Kuraray Isoprene Chemical Co. Ltd., Ibaraki; C. I. Kasei Co. Ltd., Tokyo, both of Japan

[21] Appl. No.: 344,946

[22] Filed: Feb. 2, 1982

[30] Foreign Application Priority Data

Feb. 16, 1981 [JP] Japan .................................. 56-21696

[51] Int. Cl.$^3$ ............................................. B32B 25/08
[52] U.S. Cl. ..................... 428/494; 428/492; 428/495; 428/517; 428/519; 525/196; 525/192; 525/108
[58] Field of Search ...................... 525/196, 192, 108; 428/495, 492, 517, 519, 494

[56] References Cited
FOREIGN PATENT DOCUMENTS 52-4007461 6/1977 Japan .
52-4007463 6/1977 Japan .
52-4020066 7/1977 Japan .
52-4094525 12/1977 Japan .
53-4110262 2/1978 Japan .

*Primary Examiner*—Marion McCamish
*Assistant Examiner*—E. Rollins Buffalow
*Attorney, Agent, or Firm*—Brisebois & Kruger

[57] ABSTRACT

The invention provides a novel water-swellable caulking material which is a composite body of stratified structure composed of at least one rubbery layer swellable in water comprising highly water absorbing resin dispersed in the matrix of a rubber and at least one rubbery layer not swellable in water integrally bonded together, which latter serves to resist the expansion of the former layer when swollen in water in the directions other than the direction perpendicular to the plane of the layers. The inventive caulking material can exhibit unexpectedly excellent water sealing effect with easiness in handling in addition to the rapidity in water absorption by virtue of the structure thereof preventing the expansion of the material in the directions of length and width without decreasing the expansion in the direction of thickness.

17 Claims, 3 Drawing Figures

WATER-SWELLABLE COMPOSITE CAULKING MATERIAL FOR PREVENTING WATER LEAKAGE

BACKGROUND OF THE INVENTION

The present invention relates to a caulking material used for filling and sealing interstices in various structured bodies to prevent leakage of water therethrough. More particularly, the invention relates to a water-swellable caulking material having a stratified structure of a composite body formed of a plural number of integrally bonded layers comprising (A) at least one layer of a water-swellable rubbery composition containing particles of a highly water-absorbing resin dispersed in a rubbery matrix and (B) at least one layer of a rubbery material not swellable with water which serves to resist or suppress the expansion of the composite body within the plane of the layers when the water-swellable layer (A) is swollen by absorbing water so as to limit the swelling expansion of the composite body as a whole only in the direction of the thickness of the body whereby leakage of water through the interstice of a structured body can be completely prevented irrespective of the running direction of water.

There are known several rubbery compositions compounded with particles of a water-absorbing polymeric material, such as a polyvinyl alcohol, polymer of an acrylic acid salt, carboxymethylcellulose, hydroxyethylcellulose and the like, dispersed in the matrix of a rubber (see, for example, Japanese Pat. Kokai No. 53-143653, 54-7461, 54-7463 and 54-20066) which are capable of expanding when swollen with water and useful as a caulking material for preventing water leakage. These compositions have several problems as a caulking material that the swelling pressure as one of the most important characteristics for the caulking effect cannot be sufficiently high because of the relatively low swelling ratio of the material due to the solubility of the dispersed phase of the water-absorbing material in water and that the velocity of water absorption is low so that no instant caulking effect can be obtained with the composition. Further, there is also known a rubbery composition in which the water-absorbing dispersed material is a urethane polymer. The swelling pressure obtained with a caulking material of this type is also relatively low due to the insufficient affinity of the urethane polymer to water in addition to the problem of the extremely low velocity of water absorption.

Recently, there is disclosed a water-swellable composition (see, for example, Japanese Patent Kokai 54-94525 and 54-110262) which is a combination of a copolymer of an α-olefin and maleic anhydride as the water-swellable but water-insoluble polymeric component and a nitrile-based coating material or natural rubber as the non-swellable component. The compositions of this type are useful in their own manner when used as a water-swellable coating composition or as a caulking material even though sufficiently high swelling pressure can hardly be obtained with them. That is, the rubbers such as nitrile rubbers and natural rubbers which are amorphous at room temperature may exhibit cold flow in their unvulcanized state so that the expansion of the highly water-absorbing resin by swelling with water is absorbed by the cold flow of the rubbery component not to produce sufficiently high swelling pressure at the place where a high swelling pressure is essential in order to obtain satisfactory caulking effect. A remedy for this shortcoming may be provided when the rubber component is vulcanized but the crosslinked network structure of the rubber molecules is sometimes a barrier against the expansion of the highly water-absorbing resin by swelling so that no satisfactory swelling pressure can be obtained even by this means of vulcanization.

Alternatively, two of the present co-inventors have previously conducted investigations to solve the above problems and proposed efficient caulking materials in the form of a sheet or string shaped of a rubbery composition comprising a 1,3-diene-based rubber, of which the content of the crystalline or glassy region is 5 to 50% at room temperature, and a specific highly water-absorbing resin dispersed in the matrix of the rubber. The caulking material of this type is indeed effective for preventing water leakage through interstices in structured bodies though still having problems that the caulking material expands when swollen with water in all directions not only perpendicularly to but also within the plane of the applied surface so that the swollen caulking material sometimes gets out of the interstice of the structured body resulting in the loss of the desired caulking effect.

SUMMARY OF THE INVENTION

An object of the present invention is therefore to provide a novel and improved caulking material free from the above described problems in the prior art caulking materials and capable of instantly exhibiting a sufficiently strong caulking effect with excellent workability by virtue of a unique composite structure to suppress or control the expansion of the material as a whole in the directions of the width and length while not to affect the expansion in the direction of the thickness when the material is swollen with water.

According to the present invention, the above mentioned object of the invention is well accomplished with a caulking material which is a composite body of a stratified structure formed of a plural number of integrally bonded layers comprising (A) at least one layer of a water-swellable rubbery composition containing particles of a highly water-absorbing resin dispersed in a rubbery matrix and (B) at least one layer of a rubbery material not swellable with water which serves to resist or suppress the expansion of the composite body within the plane of the layers when the water-swellable layer (A) is swollen by absorbing water.

In particular, better results are obtained with the inventive water-swellable composite caulking material when: (a) the composite body is a three-layered body composed of two layers made of the water-swellable rubbery composition (A) integrally sandwiching a layer of the non-swellable rubbery material (B), of which the volume ratio (A/B) of the water-swellable layers (A) to the non-swellable layer (B) is in the range from 15:85 to 85:15; (b) the water-swellable rubbery layers (A) are shaped of a rubbery composition prepared by dispersing a highly water-absorbing resin in a particulate form, which is obtained by crosslinking a reaction product of a polymer containing, as a monomeric constituent thereof, an α,β-unsaturated compound with one or two carboxyl groups or groups convertible to carboxyl groups in a molecule and a basic component such as alkali metal compounds, alkaline earth metal compounds, ammonia and monoamines and capable of absorbing 20 to 500 times by weight of distilled water based on the dry weight of the resin, dispersed in the matrix of a 1,3-diene-based rubber containing from 5 to 50% of the crystalline or glassy region at room temperature; and/or (c) the non-swellable rubbery layer (B) is shaped of a vulcanized or unvulcanized rubbery composition exhibiting a tensile stress of 20 to 200 kg/cm² at a 300% elongation.

In the following description, the weight ratio of the water absorbed by the highly water-absorbing resin to the resin is called "ratio of water absorption" based on the dry weight of the resin.

DETAILED DESCRIPTION OF THE PREFERRED EMBODIMENTS

Figure 3:
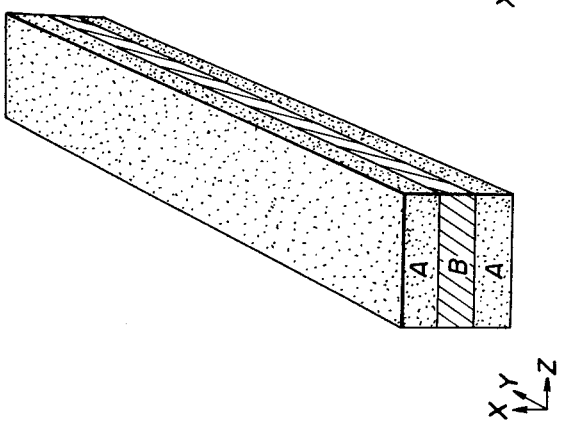
FIG. 1 to FIG. 3 each illustrate a perspective view of one of the inventive caulking materials having different cross sections. In the figures, symbols A and B indicate the water-swellable rubbery layer and the non-swellable rubbery layer, respectively, and the arrows indicated by the symbols x, y and z are for the directions of the thickness, length and width, respectively, of the composite body referred to in the text.
Figure 2:
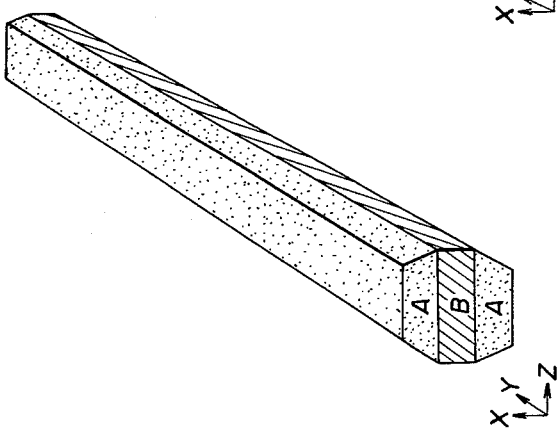

The water-swellable rubbery layer (A) forming a part of the inventive composite caulking material is a body shaped of a composition comprising a highly water-absorbing resin dispersed in the matrix of a rubber. The rubber suitable for making the matrix of the layer (A) is preferably an elastic polymer containing the recurring monomer units of a diene such as butadiene, isoprene, dimethylbutadiene, chloroprene and the like although other kinds of rubbery elastomers may be used according to need. Particular examples of the suitable rubbers include dienic rubbers such as natural rubbers (NR), synthetic cis-1,4-polyisoprene rubbers (IR), polybutadiene rubbers (BR), random-copolymerized rubbers of styrene and a diene (SBR or SIR), copolymeric rubbers of acrylonitrile and a diene (NBR or NIR), chloroprene rubbers (CR), copolymeric rubbers of isobutylene and isoprene (IIR), copolymeric rubbers of ethylene, propylene and a diene (EPDM), trans-1,4-polyisoprene rubbers, block-copolymerized rubbers of styrene and a diene and the like as well as urethane rubbers and copolymers of ethylene and vinyl acetate. Particularly preferred are those 1,3-diene-based rubbers containing recurring monomer units of a 1,3-diene, such as 1,3-butadiene, 2-methyl-1,3-butadiene, i.e. isoprene, 2,3-dimethyl-1,3-butadiene and 2-chloro-1,3-butadiene with certain amounts of crystalline or glassy regions at room temperature owing to their rapid water absorption to exhibit a sufficiently high swelling pressure when they are formed into the inventive shaped caulking material.

The above mentioned 1,3-diene-based rubbers containing crystalline or glassy regions at room temperature include the crystalline polymers comprising a 1,3-diene and the block copolymers composed of a non-crystalline polymer of a 1,3-diene and a glassy polymer.

The above mentioned crystalline polymers are exemplified by the crystalline rubbers composed substantially of a single kind of the recurring monomer units such as chloroprene rubbers, guttapercha, balata, synthetic trans-1,4-polyisoprenes and the like. Particularly preferred are the chloroprene rubbers from the standpoint of the swelling performance of the water-swellable rubbery layer (A). These crystalline polymers preferably have a molecular weight of 50,000 to 1,000,000 and a melting point of the crystalline portion in the range of 20° to 90° C.

The rubbers of the above mentioned block-copolymer type are exemplified by the block copolymers of a 1,3-diene and a monovinyl-substituted aromatic compound capable of giving a glassy polymer at room temperature such as styrene, α-methyl-styrene, vinyltoluene and the like. Among various kinds of such block-copolymerized rubbers, particularly preferred are the block-copolymerized rubbers of the so-called A-B-A type where A denotes a glassy polymer block formed of a monovinyl-substituted aromatic compound having a degree of polymerization of 10 to 2500 and a glass transition temperature of 20° to 90° C. and B denotes a non-crystalline polymer block formed of a 1,3-diene and having a degree of polymerization of 500 to 15,000. Hydrogenation products of these block-copolymerized rubbers are also suitable.

Whereas the preferred rubbers described above necessarily contain crystalline or glassy regions at room temperature, the amount of such crystalline or glassy regions should be limited not to exceed 50% in order to avoid excessively high hardness of the rubber to inhibit the expansion of the highly water-absorbing resin in the particulate form by the absorption of water since otherwise no satisfactory water-swellable rubbery layer can be obtained to exhibit a high velocity of water absorption and high swelling pressure to ensure accomplishment of the object of the invention. On the other hand, satisfactory water-swellable rubbery layers can hardly be obtained when the rubber contains no or little amounts, if any, of the crystalline or glassy regions, say, below 5% because of the increased trend toward cold flow in the unvulcanized state. In this connection, preferred content of the crystalline or glassy regions in the rubber is in the range from 5 to 50% or, more preferably, from 5 to 35%.

The crystalline region here implied has a conventional meaning used in the field of polymer chemistry and the amount thereof is expressed by the degree of crystallinity. The method for the determination thereof is described, for example, in Kobunshi Ronbun-shu (Polymer Dissertations), volume 31, pp. 138–139, and well known in the art. The glassy region, on the other hand, also has a conventional meaning in the field and the content of such glassy regions in a polymer is controllable by the amount of the monomer or monomers forming the glassy polymer.

The most preferred among the above described rubbers is a chloroprene rubber containing from 5 to 50% of the crystalline regions.

The ratio of water absorption of the highly water-absorbing resin combined with the rubber is another important parameter for the satisfactory performance of the inventive caulking material. That is, smaller ratios of water absorption of the resin lead to a smaller swelling ratio of the water-swellable rubbery layer while a resin having an excessively large ratio of water absorption may give a highly swollen resin having unsatisfactorily low mechanical strengths so that a water-swellable rubbery layer exhibiting a sufficiently high swelling pressure can be obtained only with a highly water-absorbing resin having a ratio of water absorption in a suitable range to give a caulking material integrally layered with the water-swellable rubbery layer or layers exhibiting satisfactory caulking effects. In this regard, the ratio of water absorption of the highly water-absorbing resin should be in the range from 20 to 500 or, preferably, from 50 to 400.

The highly water-absorbing resin suitable for use is preferably a crosslinked product of a polymer comprising, as the monomeric constituent thereof, an $\alpha,\beta$-unsaturated compound having, in a molecule, one or two carboxyl groups or those groups convertible to carboxyl groups such as in carboxylic acid salts, carboxylic acid amides, carboxylic acid imides, carboxylic acid anhydrides and the like from the standpoint of the water-absorbing performance and durability of the water-swellable rubbery layer.

The above mentioned $\alpha,\beta$-unsaturated compounds include, for example, acrylic acid, methacrylic acid, acrylamide, methacrylamide, maleic anhydride, maleic acid, maleinamide, maleinamic acid, maleinimide, itaconic acid, crotonic acid, fumaric acid and mesaconic acid. They can be used either singly or as a combination of two or more as well as a combination with one or more of different kinds of copolymerizable monomers provided that the performance required for the highly water-absorbing resin is adequately satisfied. The copolymerizable monomers mentioned above are exemplified by $\alpha$-olefins, vinyl compounds and vinylidene compounds such as ethylene, propylene, isobutylene, 1-butylene, diisobutylene, methylvinyl ether, styrene, vinyl acetate, acrylic esters, methacrylic esters, acrylonitrile, methacrylonitrile and the like. It should be noted that, when the highly water-absorbing resin is a copolymer of the carboxyl-containing monomer with these monomers, the copolymer desirably contains at least 40% by moles of the $\alpha,\beta$-unsaturated compound or compounds having carboxyl groups or groups convertible to carboxyl groups as the monomeric constituent.

The polymers containing the monomeric units of the above mentioned $\alpha,\beta$-unsaturated compound having carboxyl groups or groups convertible to carboxyl groups can be prepared by a known method using a free-radical polymerization initiator. Although not particularly limitative, the polymer desirably has a degree of polymerization in the range from 10 to 5000.

Among the polymers and copolymers prepared in the above described manner, particularly preferred are the polymers of acrylic acid or methacrylic acid and the copolymers of an $\alpha$-olefin or a vinyl compound with maleic anhydride. It is preferably that these polymers or copolymers are imparted with further increased affinity to water by reacting with a basic compound such as a hydroxide, oxide or carbonate of an alkali metal, e.g. sodium and potassium, or an alkaline earth metal, e.g. magnesium, calcium and barium, ammonia, monoamine and the like. The reaction with the basic compound can be performed, for example, by admixing the above named compounds of alkali metals or alkaline earth metals, ammonia or monoamines with a solution of the above polymer in a suitable solvent, preferably water, under agitation. Preferred basic compounds in this reaction are sodium hydroxide, potassium hydroxide and ammonia from the standpoint of their reactivity and the durability of the high water absorptivity of the resultant product.

The thus obtained polymeric material containing the $\alpha,\beta$-unsaturated compound or compounds as the monomeric constituent is then subjected to the crosslinking reaction. The crosslinking agents suitable for this reaction include polyvalent epoxy compounds, polyvalent amines, polyhydric alcohols, amino-alcohols, polyisocyanates and polyvalent halohydrins, among which polyvalent epoxy compounds and polyvalent amines are preferred from the standpoint of the durability and the water-absorbing power of the resultant highly water absorbing resin. The polyvalent epoxy compounds above mentioned are exemplified by glycerin diglycidyl ether, ethyleneglycol diglycidyl ether, polyethyleneglycol diglycidyl ether, glycerin triglycidyl ether, propyleneglycol diglycidyl ether, polypropyleneglycol diglycidyl ether and trimethylolpropane triglycidyl ether and the polyvalent amines above mentioned are exemplified by ethylenediamine, diethylenetriamine, triethylenetetramine, tetraethylenepentamine, pentaethylenehexamine and polyethyleneimines having a molecular weight not exceeding 5,000.

The crosslinking reaction is performed by admixing the above described polymeric material containing the $\alpha,\beta$-unsaturated compound or compounds as the monomeric constituent with the above mentioned crosslinking agent. It is optional in this case to apply heat or to use a solvent according to need. When the polyvalent epoxy compound or the polyvalent amine is used as the crosslinking agent, in particular, it is preferable to carry out the reaction with heating in the presence of water. It is further preferable in such a case that the product of the crosslinking reaction is subsequently dried or subjected to a heat treatment. The degree of crosslinking should be controlled by using an appropriate amount of the crosslinking agent so that the resultant highly water-absorbing resin has a desired ratio of water absorption.

In the following, several of the preferable examples are given of the highly water absorbing resins used in the present invention. (1) A crosslinked material of the product obtained by the reaction of a copolymer composed of maleic acid or related compounds, i.e. derivatives of maleic acid such as maleic anhydride, maleinamide, maleinimide and the like, and an $\alpha$-olefin of linear or branched structure having 2 to 12 or, preferably, 2 to 8 carbon atoms in a molecule, e.g. ethylene, propylene, butylene, isobutylene, diisobutylene and the like, with a basic compound such as alkali metal compounds, alkaline earth metal compounds, ammonia, monoamines and the like. (2) A crosslinked material of the product obtained by the reaction of a copolymer composed of maleic acid or a related compound and a vinyl or vinylidene compound, such as styrene, vinyl acetate, methylvinyl ether, acrylic acid esters, methacrylic acid esters, acrylonitrile, methacrylonitrile and the like, with a basic compound such as alkali metal compounds, alkaline earth metal compounds, ammonia, monoamines and the like. (3) A crosslinked material of the product obtained by the reaction of a polymer of acrylic acid or methacrylic acid and a basic compound such as alkali metal compounds, alkaline earth metal compounds, ammonia, monoamines and the like. (4) A crosslinked material of the product obtained by the reaction of the copolymer composed of acrylic acid or methacrylic acid and one or more of the vinyl or vinylidene compounds mentioned in (2) above and a basic compound such as alkali metal compounds, alkaline earth metal compounds, ammonia, monoamines and the like.

Among the above described classes of the crosslinked materials, particularly preferred are the crosslinked material of the product obtained by the reaction of a copolymer of isobutylene and maleic anhydride with sodium hydroxide, potassium hydroxide or ammonia and a crosslinked material of the product obtained by the reaction of polyacrylic acid and sodium hydroxide, i.e. sodium polyacrylate, from the standpoint of the water absorbing power and durability.

The highly water-absorbing resin obtained in the above described manner is preferably pulverized before use into particulate form to pass a screen of 20 mesh openings according to the mesh standard specified in JIS Z 8801. Coarser particles than above are undesirable due to the uneven expansion of the water-swellable rubber layer or decreased smoothness of the surface of the layer.

The blending ratio of the rubbery material and the highly water-absorbing resin in the particulate form in the preparation of the shaped articles for the water-swellable rubbery layer (A) is not particularly limitative according to the desired ratio of water absorption although the highly water-absorbing resin is taken in an amount from 10 to 300 parts by weight or, preferably, from 50 to 200 parts by weight per 100 parts by weight of the rubber. The shaped articles are fabricated by first milling the rubber and the highly water-absorbing resin in a conventional manner by use of a suitable mixing machine such as roller mixers, open mills, Banbury mixers, kneaders and the like to disperse the latter in the matrix of the former and then molding the rubber blend into a shaped article of a film, sheet or any other desired form. This shaped article may be vulcanized, if desired, in a conventional manner by admixing known rubber-processing chemicals used for vulcanization of rubbers such as vulcanizing agents, vulcanization accelerators, vulcanization aids, activation agents and the like. It is of course optional that the rubber blend may contain other additives such as rubber reinforcement agents, fillers, rubber softening agents, plasticizers, tackifiers, processing aids, aging retarders, antioxidants, ozonization inhibitors, ultraviolet absorbers, coloring agents and the like.

The non-swellable rubbery layer (B) supports the water-swellable rubbery layer (A) which is bonded to the former layer and forms the superficial stratum to provide a means for suppressing or controlling the expansion of the inventive composite caulking material swollen with water when it is used for water sealing in the directions other than the direction of thickness, i.e. within the plane of extension on the substrate surface. The direction of thickness as implied above is in the direction of the strata-wise bonding of the rubbery layers illustrated by the arrows x in the accompanying drawing while the directions other than the direction of thickness are the longitudinal and width-wise directions indicated by the arrows y and z, respectively, in the accompanying drawing so that the plane of extension is defined by these arrows y and z.

The non-swellable rubbery layer (B) may be formed of a shaped article of a general-purpose rubber or a vulcanized shaped article thereof. The above mentioned general-purpose rubbers are exemplified by natural rubbers (NR), synthetic cis-1,4-polyisoprene rubbers (IR), polybutadiene rubbers (BR), random- or block-copolymerized rubbers of styrene and a diene (SBR, SIR, etc.), copolymeric rubbers of acrylonitrile and a diene (NBR or NIR), butyl rubbers (IIR), chloroprene rubbers (CR), terpolymeric rubbers of ethylene, propylene and a diene (EPDM) and urethane rubbers. When a vulcanized stratified body is desired by vulcanizing these rubbers, the rubber stock is formulated with known rubber-processing chemicals used for vulcanization such as vulcanizing agents, vulcanization accelerators, vulcanization aids, activating agents and the like. It is also optional that the rubber stock may be formulated with other kinds of rubber processing agents as named above. The method for the vulcanization may be conventional.

The rubber article forming the non-swellable rubbery layer (B) must exhibit an adequate tensile stress in order that the expansion of the caulking material by swelling in the plane of extension is sufficiently suppressed but the composite caulking material still has an adequate flexibility. In this respect, the value of the tensile stress at a 300% elongation can be a useful criterion of the tensile performance of the rubber, which should be in the range from 20 to 200 kg/cm$^2$ or, preferably, from 30 to 150 kg/cm$^2$ irrespective of whether the non-swellable rubbery layer is made of a vulcanized or unvulcanized rubber. When the tensile stress at 300% elongation is too small, the caulking material expands greatly in the plane of extension so that the water-sealing effect is reduced while the caulking material prepared with a rubber exhibiting a larger tensile stress at 300% elongation than above for the non-swellable rubbery layer (B) is undesirable due to the excessive rigidity.

The water-swellable caulking material of the present invention is a composite stratified body formed of at least one water-swellable rubbery layer (A) and at least one non-swellable rubbery layer (B) integrally bonded together. In particular, the composite body must be stratified in such a manner that at least a part of the water-swellable rubbery layer (A) is exposed on the surface of the composite body so that the composite body can rapidly absorb water when it is contacted with water to generate a swelling pressure and exhibit desired caulking effect.

The stratified composite bodies may be diversified according to the manner of stratification including, for example, a two-layered stratified body obtained by integral bonding of a water-swellable rubbery layer (A) and a non-swellable rubbery layer (B) and a three-layered stratified body of sandwich structure formed of two water-swellable rubbery layers (A) integrally sandwiching a non-swellable rubbery layer (B) as well as a stratified body by alternately and integrally bonding more than three of the above mentioned water-swellable and non-swellable layers. The cross sectional configuration of the composite body may not be rectangular but irregular, for example, as shown in FIG. 3 according to need. The two-layered stratified bodies are preferable from the standpoint of material saving but sometimes may suffer from a problem in the application thereof to an interstice because the body causes curling or warping in one direction by the absorption of atmospheric moisture during storage. In this connection, the three-layered stratified bodies, in particular, of a symmetrical structure are free from such a problem of curling or warping despite the relatively small amounts of the materials necessary for forming the body and hence preferred. The accompanying drawing illustrates several examples of such three-layered stratified bodies with a symmetrical structure, in which the water-swellable rubbery layers and the non-swellable rubbery layers are indicated by the symbols A and B, respectively, and the arrows shown by x, y and z are for the directions of the thickness, length and width of the composite body, respectively.

The volume ratio of the water-swellable rubbery layer or layers (A) and the non-swellable rubbery layer (B) is also an important parameter in the above described composite body for obtaining the satisfactory caulking effect with the inventive composite caulking material. As is readily understood, no sufficiently large swelling pressure can be generated when the caulking material used for water sealing is formed of the water-swellable rubbery layer (A) in a small volume proportion while the volume proportion of the non-swellable rubbery layer (B) sould be large enough in order to absorb or suppress the expansion of the caulking material within the plane of extension. In this connection, the extensive investigations undertaken by the inventors established that the volume ratio of the water-swellable rubbery layer or layers (A) to the non-swellable rubbery layer (B) should be in the range from 15:85 to 85:15.

The composite body is prepared by integrally molding together at least one water-swellable rubbery layer (A) and at least one non-swellable rubbery layer (B) in a desired disposition or by adhesively bonding the respective layers prepared in advance. The water-swellable rubbery layer (A) and the non-swellable rubbery layer (B) may be vulcanized either in advance before integration or after being integrally bonded together.

The thus obtained composite body is used as such as a caulking material for water sealing. The inventive composite caulking material may be prepared in the form of a sheet of a unit size or a continuous length sheet in a roll. It is advisable that the surface of the caulking material is protected by attaching a moisture-proof film of plastics or other materials to prevent moisture absorption during storage and the film is peeled off directly before use.

In the following, the present invention is described in further detail by way of examples, which, of course, merely illustrate several embodiments of the invention and should not be construed to limit the scope of the invention in any way. In the examples and the comparative examples given below, "parts" always refers to "parts by weight" unless otherwise mentioned.

EXAMPLE 1

A homogeneous aqueous solution was prepared by dissolving 100 parts of a copolymer of isobutylene and maleic anhydride having a molecular weight of 160,000 to 170,000 (an alternate interpolymer sold by Kuraray Isoprene Chemical Co. with a tradename of Isobam-10) and 42 parts of sodium hydroxide in 260 parts of water at 90° C. with agitation. The aqueous solution was then admixed with 1.5 parts of glycerin diglycidyl ether having an epoxy equivalent of 140 with violent stirring and the resultant solution was applied to the surface of a chromium-plated iron plate kept at about 90° C. followed by drying. The polymer film obtained by peeling off the plate was pulverized into a powder to pass a screen of 20 mesh openings, which is then heat-treated in a hot air oven at 120° C. The thus obtained resin powder was highly water-absorbing exhibiting a ratio of water absorption of about 130.

This highly water-absorbing resin in powdery form was blended with a chloroprene rubber having a degree of crystallinity of 18% (Neoprene W, a product by Showa Neoprene Co.) in a proportion indicated in Table 1 below and the blend was well milled in an 8-inch open roll and molded into a water-swellable rubbery sheet $A_1$ of 2.5 mm thickness. The degree of crystallinity of the chloroprene rubber was determined according to the method described in Kobunshi Ronbunshu recited before using a differential scanning calorimeter.

TABLE 1

| Component | Parts |
| --- | --- |
| Chloroprene rubber (Neoprene W) | 100 |
| Highly water-absorbing resin (powdery) | 100 |
| Zinc white (#1 grade) | 5 |
| Magnesium oxide (Kyowamag 30) | 4 |
| Stearic acid | 1 |
| Vulcanization accelerator[1] | 0.5 |
| Aging retarder[2] | 2 |

[1]Ethylene thiourea (2-mercaptoimidazoline); Accel 22, a product by Kawaguchi Chemical Co.
[2]2,2'-Methylenebis(4-methyl-6-tert-butylphenol);

Nocrack NS-6, a product by Ouchi Shinko Chemical Co.

On the other hand, a non-swellable rubber sheet $B_1$ of 2 mm thickness was prepared according to the formulation given in Table 2 below by roll milling in an 8-inch open roll. The tensile stress of this rubber sheet at 300% elongation was 34 kg/cm² when it was vulcanized alone at 150° C. for 14 minutes.

TABLE 2

| Component | Parts |
| --- | --- |
| Chloroprene rubber (Neoprene W) | 100 |
| Zinc white (#1 grade) | 5 |
| Magnesium oxide (Kyowamag 30) | 4 |
| Stearic acid | 1 |
| Vulcanization accelerator (Accel 22) | 0.5 |
| Aging retarder (NS-6) | 2 |
| Magnesium carbonate, light | 100 |

Figure 1:
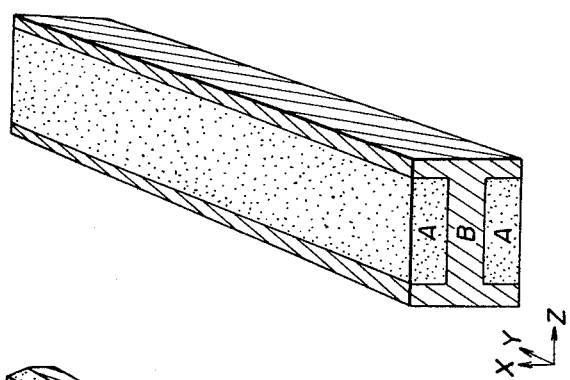

The non-swellable rubber sheet $B_1$ above prepared was sandwiched by two sheets of the water-swellable rubber $A_1$ and the thus stratified rubber sheets were integrally vulcanized in a hot press at 150° C. for 14 minutes to give a composite sheet $C_1$ as shown in FIG. 1, in which A denotes each of the water-swellable rubber sheets and B denotes the non-swellable rubber sheet.

Test pieces of each 15 mm width and 150 mm or 630 mm length were taken by cutting the thus obtained composite sheet $C_1$ and the performance thereof as a caulking material was evaluated according to the methods described below. The first of the testing methods was the swellability test in which the test piece of 150 mm length was dipped for 7 days in water at 25° C. and the length, width and thickness of the swollen test piece were determined to calculate the ratio of expansion in each of the dimensions. The second of the testing methods was the water sealing test in which the above prepared elongated test piece of 630 mm length was rounded and bonded at both ends to make a ring which was used as a caulking material for a B-type Hume concrete pipe, i.e. iron-rod reinforced concrete pipes by centrifugal casting, of 200 mm nominal diameter specified in JIS A 5303 under a hydraulic pressure of 2 kg/cm².

The results of the swellability test are shown in Table 3 indicating that the ratios of expansion in the directions of length and width are remarkably smaller than in the direction of thickness of the test piece.

TABLE 3

| Direction | Ratio of expansion |
| --- | --- |
| Length | 72% |
| Width | 70% |
| Thickness | 213% |

Further, the results of the water sealing test were quite satisfactory with absolutely no leakage of water.

Comparative Example 1

A water-swellable rubber sheet of 8 mm thickness was prepared of the same rubbery composition as used in Example 1 for the preparation of the water-swellable rubber sheet $A_1$ according to the formulation given in Table 1 by vulcanizing at 150° C. for 14 minutes. This sheet alone was evaluated by the swellability test and the water sealing test in the same manner as in Example 1. The results of the swellability test are shown in Table 4 below.

TABLE 4

| Direction | Ratio of expansion |
|---|---|
| Length | 296% |
| Width | 281% |
| Thickness | 287% |

As is clear from the table, the ratios of expansion in the directions of length and width were about the same as in the direction of thickness although the expansion in the direction of thickness was larger than in Example 1. No satisfactory effect of water sealing was obtained in the water sealing test with more or less of water leakage.

EXAMPLE 2

According to the same formulations and procedures as in the preparation of the rubber sheets $A_1$ and $B_1$ in Example 1, water swellable ($A_{2x}$) and non-swellable ($B_{2x}$) sheets with several different thicknesses were prepared of the rubbery compositions and several composite sheets $C_{2x}$ each having a thickness of 8 mm were prepared by sandwiching the non-swellable sheet $B_{2x}$ with two of the water-swellable sheets $A_{2x}$ so that the composite sheets $C_{2x}$ had different volume ratios of the water-swellable rubbery layers to the non-swellable rubbery layer $A_{2x}/B_{2x}$. Table 5 below gives the thickness of each of the three layers, i.e. the first and the third layers formed of the water-swellable rubber sheets $A_{2x}$ and the second layer formed of the non-swellable rubber sheet $B_{2x}$, and the volume ratio $A_{2x}/B_{2x}$ for each of the composite sheets $C_{2x}$. Table 5 also summarizes the results of the swellability test and the water sealing test undertaken with these composite sheets $C_{2x}$.

TABLE 5

| Composite sheet No. | Volume ratio, $A_{2x}/B_{2x}$ | Thickness of layers, mm 1st | 2nd | 3rd | Swellability test, expansion in the length-wise direction, % | Water sealing test, leakage of water |
|---|---|---|---|---|---|---|
| $C_{21}$ | 90/10 | 3.6 | 0.8 | 3.6 | 130 | Yes |
| $C_{22}$ | 85/15 | 3.4 | 1.2 | 3.4 | 96 | No |
| $C_{23}$ | 70/30 | 2.8 | 2.4 | 2.8 | 84 | No |
| $C_{24}$ | 62.5/37.5 | 2.5 | 3.0 | 2.5 | 72 | No |
| $C_{25}$ | 50/50 | 2.0 | 4.0 | 2.0 | 64 | No |
| $C_{26}$ | 30/70 | 1.2 | 5.6 | 1.2 | 52 | No |
| $C_{27}$ | 15/85 | 0.6 | 6.8 | 0.6 | 38 | No |
| $C_{28}$ | 10/90 | 0.4 | 7.2 | 0.4 | 20 | Yes |

As is clear from the results shown in the table, the expansion in the direction of length of the test piece is smaller when the volume ratio of the water-swellable rubbery layer is smaller in the composite sheet. Further, the results in the water sealing test indicates that the composite sheet must have a volume ratio of the water-swellable rubbery layers to the non-swellable rubbery layer $A_{2x}/B_{2x}$ in the range from 85:15 to 15:85 in order to exhibit satisfactory caulking effect to prevent water leakage.

EXAMPLE 3

A highly water absorbing resin in a powdery form was prepared in the same manner as in the preparation of the highly water absorbing resin of the powdery form in Example 1 with an aqueous solution obtained by dissolving 100 parts of sodium salt of polyacrylic acid (Aronbis S, a product by Nippon Junyaku Kogyo Co.) in water followed by admixing of 2.0 parts of glycerin diglycidyl ether having an epoxy equivalent of 145 under vigorous agitation. The ratio of water absorption of this resin was about 90.

A water-swellable rubber sheet $A_3$ of 2.5 mm thickness was prepared in the same manner as in the preparation of the water-swellable rubber sheet $A_1$ in Example 1 except that the highly water absorbing resin was the above prepared one.

On the other hand, non-swellable unvulcanized rubber sheets $B_{3x}$ were prepared by milling and molding rubber compositions based on a synthetic polyisoprene rubber according to the formulations given in Table 6 below with different amounts of carbon black loading. Table 6 also gives the values of the tensile stress at 300% elongation of the rubber sheets vulcanized at 145° C. for the optimum length of vulcanization time, i.e. the time of vulcanization at which the tensile strength of each of the vulcanized rubber sheet was maximum. The tensile stress at 300% elongation was varied from 15 to 212 kg/cm² with the increase of the carbon black loading.

Composite rubber sheets $C_{31}$ to $C_{37}$ of three-layered stratified structure useful as a caulking material were prepared by sandwiching one of the above prepared non-swellable rubber sheets $B_{3x}$ with two of the water-swellable rubber sheets $A_3$ followed by the vulcanization in a hot press at 145° C. for a length of time corresponding to the optimum vulcanization time for each of the non-swellable rubber compositions $B_{3x}$.

The swellability test and the water sealing test were undertaken with these composite rubber sheets in the same manner as in Example 1 to give the results shown in Table 6. It was noted that the composite sheet $C_{37}$ was so rigid that difficulties were encountered in handling and mounting the test piece on the Hume concrete pipes.

TABLE 6

| | No. 1 | 2 | 3 | 4 | 5 | 6 | 7 |
|---|---|---|---|---|---|---|---|
| Formulation of non-swellable rubber (parts) | | | | | | | |
| Synthetic polyisoprene rubber[1] | 100 | 100 | 100 | 100 | 100 | 100 | 100 |
| Carbon black[2] | 0 | 5 | 15 | 35 | 45 | 55 | 60 |
| Zinc white (#1 grade) | 5 | 5 | 5 | 5 | 5 | 5 | 5 |
| Stearic acid | 3 | 3 | 3 | 3 | 3 | 3 | 3 |

TABLE 6-continued

| | No. | | | | | | |
|---|---|---|---|---|---|---|---|
| | 1 | 2 | 3 | 4 | 5 | 6 | 7 |
| Vulcanization accelerator[3] | 1 | 1 | 1 | 1 | 1 | 1 | 1 |
| Aging retarder[4] | 1 | 1 | 1 | 1 | 1 | 1 | 1 |
| Sulfur | 2 | 2 | 2 | 2 | 2 | 2 | 2 |
| Tensile stress at 300% elongation of the non-swellable rubber sheet after vulcanization, kg/cm$^2$ | 15 | 21 | 48 | 87 | 140 | 195 | 212 |
| Composite sheet | $C_{31}$ | $C_{32}$ | $C_{33}$ | $C_{34}$ | $C_{35}$ | $C_{36}$ | $C_{37}$ |
| Swellability test, expansion in the length-wise direction, % | 125 | 85 | 28 | 13 | 7 | 3 | 1 |
| Water sealing test, leakage of water | Yes | no | no | no | no | no | no |

[1] Synthetic cis-1,4-polyisoprene rubber having a molecualr weight of about 840,000 and containing about 98% of the cis-1,4 component; Kuraray Polyisoprene IR-10, a product by Kuraray Isoprene Chemical Co.
[2] Diablack H, a product by Mitsubishi Chemical Co.
[3] N—Oxydiethylene-2-benzothiazole sulfenamide; Nocceler NSA-F, a product by Ouchi Shinko Chemical Co.
[4] Polymerized trimethyl dihydroquinoline; Nocrack 224, a product of Ouchi Shinko Chemical Co.

As is shown in Table 6, the composite sheet $C_{31}$ exhibited expansion in the length-wise direction in excess of 100% in the swellability test and was unsatisfactory in the water sealing test with some leakage of water. These results support and are consistent with the results in the preceding Examples and Comparative Example that water leakage in the water sealing test took place when the expansion of the composite sheet exceeds about 100% in the direction of the length or width.

Further, it was noted that the composite sheet as the caulking material could not have satisfactory water sealing power when the vulcanized non-swellable rubber sheet comprised therein had a tensile stress at 300% elongation of 15 kg/cm$^2$ as is shown by the results with the composite sheet $C_{31}$ while the composite sheet $C_{37}$ formed of a vulcanized non-swellable rubber sheet having a tensile stress at 300% elongation of 212 kg/cm$^2$ was unsatisfactory in the difficulty in handling as is mentioned before. These results led to a conclusion that the non-swellable rubber sheet as vulcanized should have a tensile stress at 300% elongation in the range from about 20 to about 200 kg/cm$^2$ in order that the composite sheet as the caulking material may have a satisfactory caulking effect.

EXAMPLE 4

A homogeneous aqueous solution was prepared by dissolving 100 parts of the same copolymer of isobutylene and maleic anhydride as used in Example 1 and 42 parts of sodium hydroxide in 258 parts of water followed by heating at 90° C. for 6 hours with agitation. The aqueous solution was further admixed with 0.45 part of a polyethyleneimine having a molecular weight of about 1200 (Polyethyleneimine SP-012, a product by Nippon Shokubai Kogyo Co.) with agitation and the solution was applied to a chromium-plated iron plate kept at about 90° C. and dried. The film dried on the plate was taken by peeling and pulverized into a powdery form to pass through a screen of 20 mesh openings, which was then subjected to a heat treatment in a hot air oven at 160° C. to give a highly water absorbing resin in a powdery form. The ratio of water absorption of this resin was about 130.

A water-swellable rubber sheet $A_4$ of 2.5 mm thickness was prepared by use of the above prepared highly water absorbing resin in the powdery form and a chloroprene rubber having a degree of crystallinity of 18% by milling in an 8-inch open roll according to the formulation given in Table 1.

On the other hand, a non-swellable unvulcanized rubber sheet $B_4$ of 3 mm thickness was prepared according to the formulation No. 4 in Table 6 of Example 3. This non-swellable rubber sheet $B_4$ was sandwiched with two water-swellable rubber sheets $A_4$ and vulcanized in a hot press at 140° C. for 20 minutes to give a composite sheet $C_4$ useful as a caulking material.

This composite sheet was evaluated by the swellability test and the water sealing test in the same manner as in Example 1. The expansion of the sheet in the length-wise direction was 10% in the swellability test and no water leakage was noted in the water sealing test.

What is claimed is:

1. A water-swellable caulking material of a composite body of stratified structure comprising at least one water-swellable rubbery layer containing a highly water absorbing resin dispersed in the matrix of a rubber and at least one rubbery layer not swellable in water integrally bonded together, the latter non-swellable rubbery layer serving to resist the expansion of the former water-swellable rubber layer in the directions other than the direction perpendicular to the plane of the layers when swollen in water.

2. The water-swellable caulking material as claimed in claim 1 wherein the rubber forming the water-swellable rubbery layer is a 1,3-diene rubber.

3. The water-swellable caulking material as claimed in claim 2 wherein the 1,3-diene rubber is a rubber containing from 5 to 50% of the crystalline region or glassy region at room temperature.

4. The water-swellable caulking material as claimed in claim 2 wherein the 1,3-diene rubber is a chloroprene rubber containing from 5 to 50% of the crystalline region.

5. The water-swellable caulking material as claimed in claim 1 wherein the highly water absorbing resin is a crosslinked material obtained by crosslinking a reaction product of
  (a) a polymer containing a monomeric constituent which is an α,β-unsaturated compound having, in a molecule, one or two functional groups selected from the class consisting of carboxyl groups and groups convertible to carboxyl groups, and
  (b) a basic substance selected from the class consisting of alkali metal compounds, alkaline earth metal compounds, ammonia and monoamines,
by use of a crosslinking agent.

6. The water-swellable caulking material as claimed in claim 1 wherein the highly water absorbing resin is a crosslinked material obtained by crosslinking a reaction product of (a) a copolymer of an α-olefin and maleic anhydride, and
(b) a basic substance selected from the class consisting of alkali metal compounds, alkaline earth metal compounds, ammonia and monoamines, by use of a crosslinking agent.

7. The water-swellable caulking material as claimed in claim 6 wherein the α-olefin is isobutylene.

8. The water-swellable caulking material as claimed in claim 1 wherein the highly water absorbing resin is a crosslinked material obtained by crosslinking a reaction product of
(a) a copolymer of maleic anhydride and a vinyl or vinylidene compound selected from the class consisting of styrene, vinyl acetate, methylvinyl ether, esters of acrylic acid, esters of methacrylic acid and acrylonitrile, and
(b) a basic substance selected from the class consisting of alkali metal compounds, alkaline earth metal compounds, ammonia and monoamines, by use of a crosslinking agent.

9. The water-swellable caulking material as claimed in claim 1 wherein the highly water absorbing resin is a crosslinked material obtained by crosslinking a reaction product of
(a) a polymer selected from the class consisting of polymers of acrylic acid and polymers of methacrylic acid, and
(b) a basic substance selected from the class consisting of alkali metal compounds, alkaline earth metal compounds, ammonia and monoamines, by use of a crosslinking agent.

10. The water-swellable caulking material as claimed in either one of claims 5, 6, 8 and 9 wherein the crosslinking agent is a polyepoxy compound selected from the class consisting of glycerin diglycidyl ether, ethyleneglycol diglycidyl ether, polyethyleneglycol diglycidyl ether, glycerin triglycidyl ether, propyleneglycol diglycidyl ether, polypropyleneglycol diglycidyl ether and trimethylolpropane triglycidyl ether.

11. The water-swellable caulking material as claimed in either one of claims 5, 6, 8 and 9 wherein the crosslinking agent is a polyamine selected from the class consisting of ethylenediamine, diethylenetriamine, triethylenetramine, tetraethylenepentamine, pentaethylenehexamine and polyethyleneimines having a molecular weight not exceeding 5000.

12. The water-swellable caulking material as claimed in claim 1 wherein the highly water absorbing resin has a ratio of water absorption in the range from 20 to 500 times by weight when swollen in water based on the dry weight thereof.

13. The water-swellable caulking material as claimed in claim 1 wherein the highly water absorbing resin is in a powdery form to pass through a screen of 20 mesh openings.

14. The water-swellable caulking material as claimed in claim 1 wherein the water-swellable rubbery layer containing the highly water absorbing resin dispersed in the matrix of the rubber is a shaped article comprising from 10 to 300 parts by weight of the highly water absorbing resin per 100 parts by weight of the rubber.

15. The water-swellable caulking material as claimed in claim 1 wherein the rubbery layer not swellable in water is formed of a shaped article of a vulcanized or unvulcanized rubber having a tensile stress in the range from 20 to 200 kg/cm$^2$ at 300% elongation.

16. The water-swellable caulking material as claimed in claim 1 wherein the rubbery layer not swellable in water is formed of a shaped article of at least one rubber selected from the class consisting of natural rubbers, synthetic cis-1,4-polyisoprene rubbers, polybutadiene rubbers, copolymeric rubbers of styrene and a diene, copolymeric rubbers of acrylonitrile and a diene, butyl rubbers, chloroprene rubbers and a terpolymeric rubbers of ethylene, propylene and a diene.

17. The water-swellable caulking material as claimed in claim 1 wherein the composite body is a three-layered stratified body composed of a rubbery layer not swellable in water integrally sandwiched together by two water-swellable rubbery layers, the volume ratio of the water-swellable rubbery layers to the rubbery layer not swellable in water being in the range from 15:85 to 85:15.

* * * * *